United States Patent
Baick (10) Patent No.: US 11,615,573 B2
(45) Date of Patent: Mar. 28, 2023

(54) METHOD, SYSTEM, AND NON-TRANSITORY COMPUTER-READABLE RECORD MEDIUM FOR PROVIDING ANIMATION USING SPRITE JPEG

(71) Applicant: LINE Plus Corporation, Seongnam-si (KR)

(72) Inventor: Joonsick Baick, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/178,379

(22) Filed: Feb. 18, 2021

(65) Prior Publication Data

US 2021/0264657 A1 Aug. 26, 2021

(30) Foreign Application Priority Data

Feb. 26, 2020 (KR) ........................ 10-2020-0023684

(51) Int. Cl.
*G06T 13/80* (2011.01)
*H04N 21/45* (2011.01)
*H04N 21/4788* (2011.01)
*G06T 3/40* (2006.01)

(52) U.S. Cl.
CPC ............... *G06T 13/80* (2013.01); *G06T 3/40* (2013.01); *H04N 21/4532* (2013.01); *H04N 21/4788* (2013.01)

(58) Field of Classification Search
CPC .................................................. G06T 13/80
See application file for complete search history.

(56) References Cited

U.S. PATENT DOCUMENTS

| 8,255,437 | B2 * | 8/2012 | Kim ................. H04N 21/44012 |
| | | | 707/916 |
| 9,542,760 | B1 * | 1/2017 | Hu ........................ H04N 19/119 |
| 10,893,052 | B1 * | 1/2021 | Bosworth ............. G06F 21/629 |
| 10,924,629 | B1 * | 2/2021 | Siagian ................ G06V 10/764 |
| 11,057,637 | B1 * | 7/2021 | Levi ..................... H04N 19/176 |
| 11,399,147 | B2 * | 7/2022 | Koizumi ............... G06F 1/3212 |
| 2002/0039385 | A1 * | 4/2002 | Okada ...................... H04N 5/45 |
| | | | 375/E7.145 |

(Continued)

FOREIGN PATENT DOCUMENTS

KR     10-0827198 B1     5/2008

OTHER PUBLICATIONS

Sharpe II et al., JPEG 2000 .jpm file format: a layered imaging architecture for document imaging and basic animation on the web, 2000 (Year: 2000).*

(Continued)

*Primary Examiner* — Phong X Nguyen
(74) *Attorney, Agent, or Firm* — Harness, Dickey & Pierce, P.L.C.

(57) ABSTRACT

Disclosed is a method, system, and non-transitory computer-readable record medium for providing an animation function using a sprite joint photographic experts group (JPEG) image. An animated image providing method includes creating, by processing circuitry, a sprite joint photographic experts group (JPEG) image from a video in an animated format, and providing, by the processing circuitry, an animated thumbnail of the video based on the sprite JPEG image.

20 Claims, 9 Drawing Sheets

(56) References Cited

U.S. PATENT DOCUMENTS

| | | | |
|---|---|---|---|
| 2007/0103470 A1* | 5/2007 | Han | G06T 13/80 |
| | | | 345/473 |
| 2009/0165037 A1* | 6/2009 | Van De Pol | H04N 21/85406 |
| | | | 725/32 |
| 2010/0185776 A1* | 7/2010 | Hosur | H04L 65/61 |
| | | | 707/741 |
| 2013/0016790 A1* | 1/2013 | Jiang | H04N 19/59 |
| | | | 375/E7.027 |
| 2014/0044412 A1* | 2/2014 | Koshel | G09G 5/00 |
| | | | 386/278 |
| 2014/0359447 A1* | 12/2014 | Kannan | G06F 3/04855 |
| | | | 715/720 |
| 2015/0091921 A1* | 4/2015 | Cote | H04N 19/91 |
| | | | 345/522 |
| 2015/0371426 A1* | 12/2015 | Levy | G06T 13/80 |
| | | | 345/473 |
| 2017/0034173 A1* | 2/2017 | Miller | H04L 63/10 |
| 2017/0116161 A1* | 4/2017 | Stein | G06Q 50/01 |
| 2017/0134776 A1* | 5/2017 | Ranjeet | G11B 27/031 |
| 2021/0264657 A1* | 8/2021 | Baick | H04N 21/234363 |
| 2022/0337894 A1* | 10/2022 | Price | H04N 5/2329 |

OTHER PUBLICATIONS

Richter et al., JPEG XT: A New Family of JPEG Backward-Compatible Standards, 2016 (Year: 2016).*

* cited by examiner

METHOD, SYSTEM, AND NON-TRANSITORY COMPUTER-READABLE RECORD MEDIUM FOR PROVIDING ANIMATION USING SPRITE JPEG

CROSS-REFERENCE TO RELATED APPLICATION(S)

This U.S. non-provisional application claims the benefit of priority under 35 U.S.C. § 119 to Korean Patent Application No. 10-2020-0023684, filed Feb. 26, 2020, the entire contents of which are incorporated herein by reference in their entirety.

TECHNICAL FIELD

At least one example embodiment relates to technology for providing an animated image.

BACKGROUND

The rapid increase in the number of users of high-speed communication networks has enabled the development of, and increased demand for, new services and diversification of service items through communication networks. A most common service among services using the communication networks may be called a video providing service.

For example, technology exists for providing a video link service capable of viewing a linked video on the Internet, while moving, using a mobile communication terminal.

SUMMARY

At least one example embodiment may implement an animated thumbnail of a video using a sprite joint photographic experts group (JPEG) image.

At least one example embodiment may provide a preview function of a video using an animation effect through a sprite JPEG image.

According to an aspect of at least one example embodiment, there is provided an animated image providing method implemented by a computer apparatus including processing circuitry, the animated image providing method comprising: creating, by the processing circuitry, a sprite joint photographic experts group (JPEG) image from a video in an animated format, and providing, by the processing circuitry, an animated thumbnail of the video based on the sprite JPEG image.

The creating may create the sprite JPEG image by concatenating at least a portion of frames of the video in a vertical direction from top to bottom.

The creating may include compressing the portion of the frames into a single JPEG image, the portion of the frames being arranged in a number of columns based on a maximum resolution.

The animated thumbnail may include a header specifying animation playback information.

The animation playback information may include a resolution, a frame rate, and an animation iteration count.

The header may be a JPEG comment header.

The providing may provide the animated thumbnail to a client end, the client end being configured to decode the sprite JPEG image to obtain a decoded sprite JPEG image, crop the decoded sprite JPEG image based on a frame rate to obtain a cropped sprite JPEG image, and display the cropped sprite JPEG image.

The providing may provide the animated thumbnail to an electronic device of a user in response to the video being set as a profile of another user of a messenger platform, the user having a relationship with the other user on the messenger platform.

The animated thumbnail may be a preview of the video, and the providing may provide the animated thumbnail to an electronic device using a video sharing service in response to the video being uploaded to a video sharing service platform.

According to an aspect of at least one example embodiment, there is provided an animated image providing method implemented by a computer apparatus including processing circuitry, the animated image providing method including receiving, by the processing circuitry, a sprite joint photographic experts group (JPEG) image in an animated format from a server, the sprite JPEG image corresponding to a thumbnail of a video, the video being set as a video profile among a plurality of profiles in a friend list on a messenger, and generating, by the processing circuitry, a preview of the video profile using an animation effect based on the sprite JPEG image for display on the friend list.

According to an aspect of at least one example embodiment, there is provided an animated image providing method implemented by a computer apparatus including processing circuitry, the animated image providing method including receiving, by the processing circuitry, sprite joint photographic experts group (JPEG) image in an animated format from a server, the sprite JPEG image corresponding to a thumbnail of a video, the video being included on a video list, the video list including at least one video on a video sharing service, and generating, by the processing circuitry, a preview of the video using an animation effect based on the sprite JPEG image for display on the video list.

According to an aspect of at least one example embodiment, there is provided a non-transitory computer-readable record medium storing instructions that, when executed by at least one processor, cause the at least one processor to perform the animated image providing method.

According to an aspect of at least one example embodiment, there is provided a computer apparatus including processing circuitry configured to cause the computer apparatus to create a sprite joint photographic experts group (JPEG) image from a video in an animated format, and provide an animated thumbnail of the video based on the sprite JPEG image.

Further areas of applicability will become apparent from the description provided herein. The description and specific examples in this summary are intended for purposes of illustration only and are not intended to limit the scope of the present disclosure.

DETAILED DESCRIPTION

At least one example embodiment will be described in detail with reference to the accompanying drawings. At least one example embodiment, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to at least one example embodiment. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which at least one example embodiment belongs. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, at least one example embodiment may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of at least one example embodiment may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one example embodiment will be described with reference to the accompanying drawings.

At least one example embodiment relates to technology for providing a video related service, and more particularly, relates to technology for providing an animation function using a sprite joint photographic experts group (JPEG) image.

At least one example embodiment described herein may implement an animated thumbnail of a video using a sprite JPEG image and may achieve many advantages in terms of video quality and/or compression efficiency.

Figure 1:
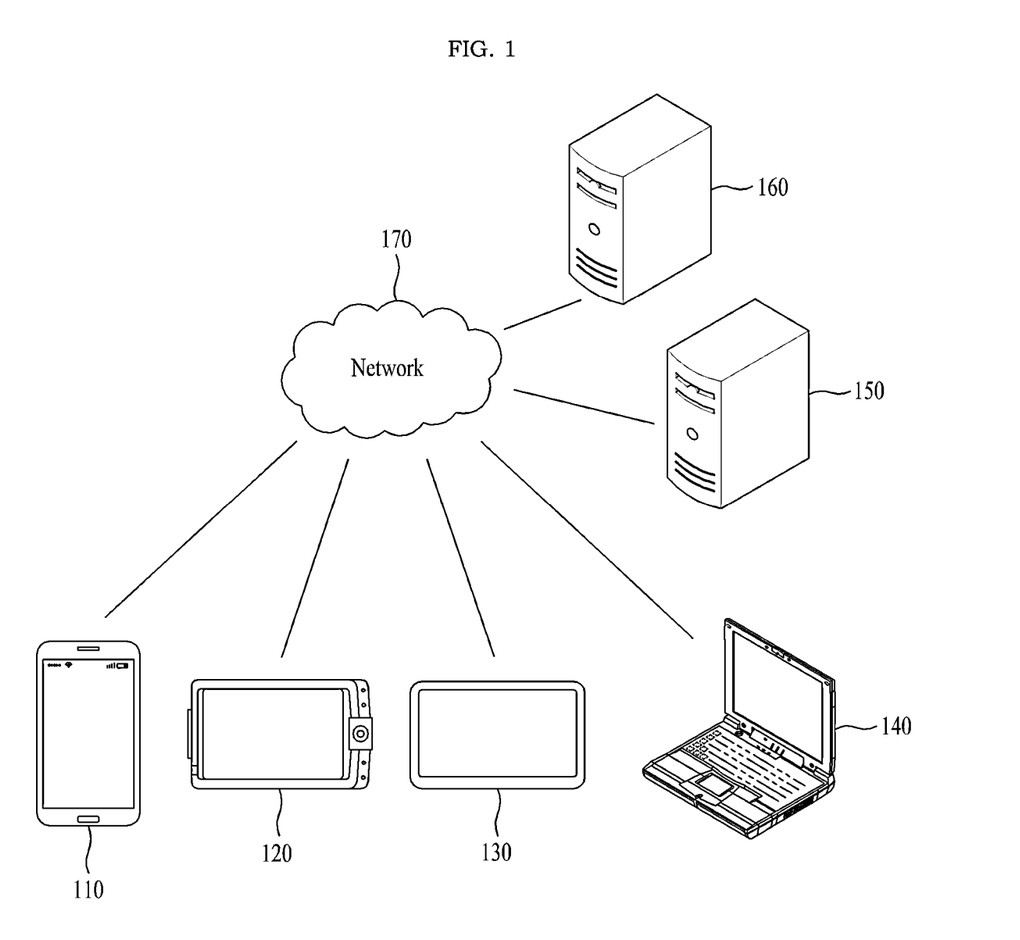
FIG. 1 is a diagram illustrating an example of a network environment according to at least one example embodiment.

FIG. 1 illustrates an example of a network environment according to at least one example embodiment. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto.

Each of the plurality of electronic devices 110, 120, 130, and/or 140 may be a fixed terminal or a mobile terminal that is configured as a computer system. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and/or the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and/or the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. In detail, the server 150 may provide, as the first service, a service (e.g., a video related service) intended (e.g., requested) by an application through the application as a computer program installed and executed on the plurality of electronic devices 110, 120, 130, and/or 140. As another example, the server 160 may provide, as the second service, a service that distributes a file for installing and executing the application to the plurality of electronic devices 110, 120, 130, and/or 140.

Figure 2:
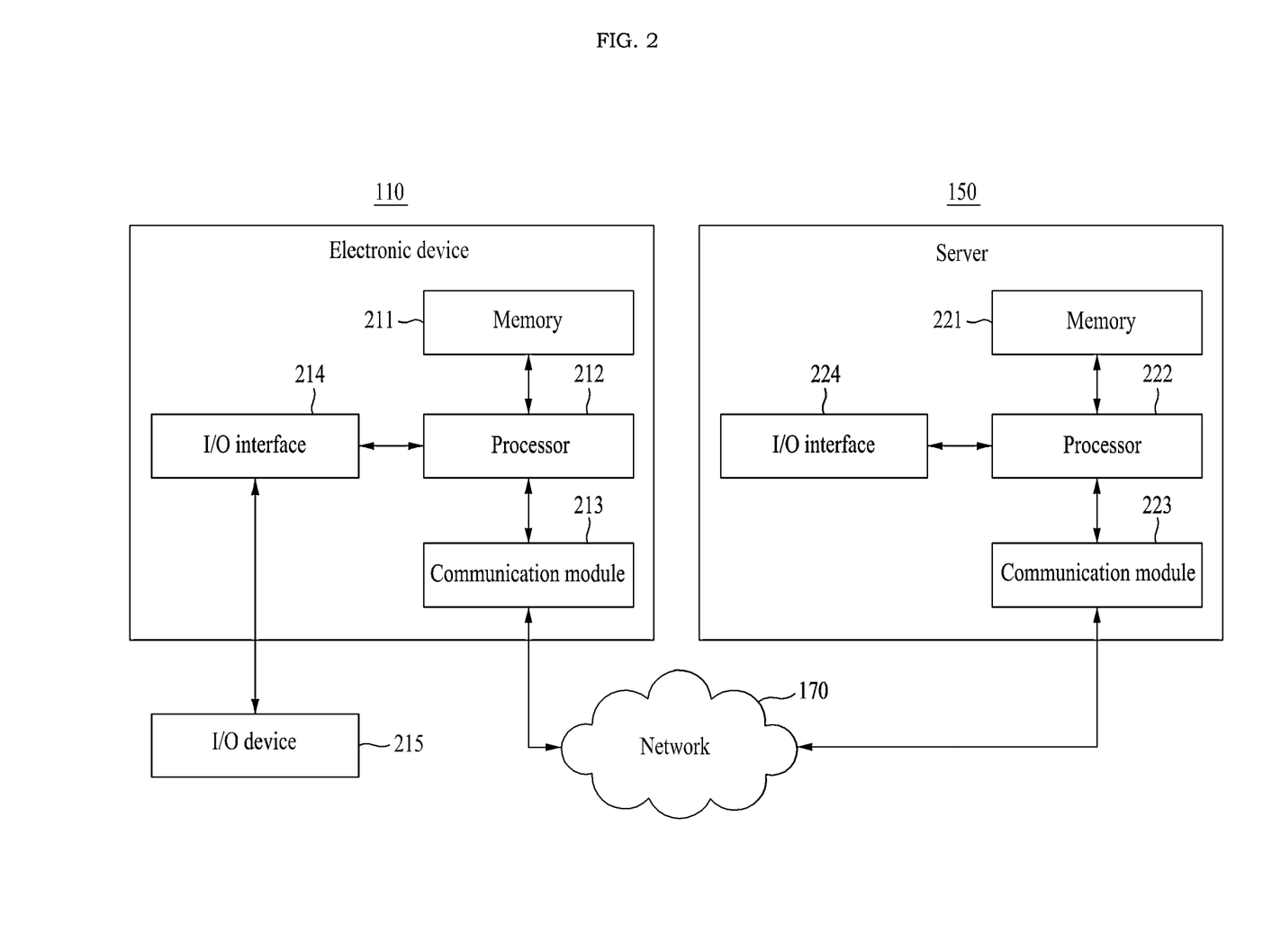
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and/or 140, and/or the server 160, may have the same or a similar configuration as that of the electronic device 110 or the server 150.

Referring to FIG. 2, the electronic device 110 may include a memory 211, a processor 212, a communication module 213, and/or an input/output (I/O) interface 214, and the server 150 may include a memory 221, a processor 222, a communication module 223, and/or an I/O interface 224. The memory 211, 221 may include a permanent mass storage device, such as a random access memory (RAM), a read only memory (ROM), a disk drive, a solid state drive (SSD), a flash memory, etc., as a non-transitory computer-readable record medium. The permanent mass storage device, such as ROM, a SSD, flash memory, and/or a disk drive, may be included in the electronic device 110 or the server 150 as a permanent storage device separate from the memory 211, 221. Also, an OS and at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to at least one example embodiment, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and/or I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110, and/or the server 150, and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215 (e.g., an I/O device, an input device and/or an output device). For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to at least one example embodiment, the electronic device 110 and the server 150 may include a number of components greater than or less than a number of components shown in FIG. 2. However, some components according to the related art are not illustrated in detail. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, at least one example embodiment of a method and system for providing an animation function using a sprite JPEG image are described.

In a video related service, there is an increasing demand for an animated image for a thumbnail of a video.

In general, a format that supports animation may include graphics interchange format (GIF), portable network graphics (PNG), and the like.

GIF refers to a format for encoding graphics that are not true color images. GIF refers to an encoding method by subsampling 256 colors using an internal lookup table. Therefore, the image quality may be severely degraded. To support a true color, a plurality of tables may be used, which may lead to a corresponding degradation of the compression efficiency. GIF is basically in a structure in which the severe degradation occurs in a preprocessing process.

PNG refers to a lossless compression scheme and refers to an image compression scheme that further reflects the consideration of an image than GIF. PNG encoding involves performing general entropy coding after four types of simple filtering to decrease data entropy. Additionally, there is an option of using a lookup table, such as GIF. Similar to GIF, PNG may have an excellent compression efficiency in simple pattern graphics and may have a low compression efficiency in a general video with high entropy.

In that GIF has a great loss in the image quality and PNG has a great loss in the compression efficiency, all of the aforementioned formats are unstable in implementing an animated thumbnail.

At least one example embodiment may provide a sprite JPEG based animated image for a thumbnail of a video.

Figure 3:
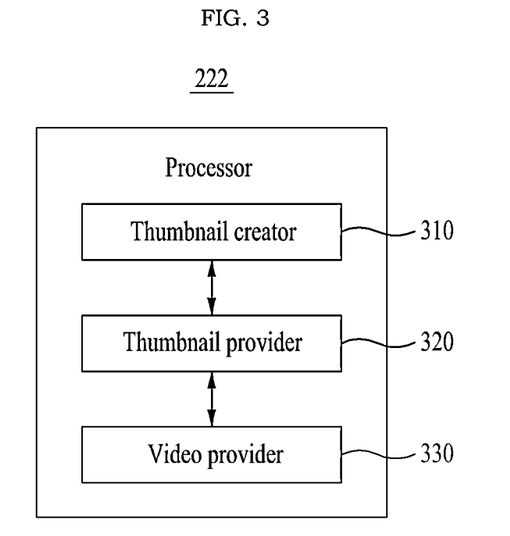
FIG. 3 is a diagram illustrating an example of components includable in a processor of a server according to at least one example embodiment.
Figure 4:
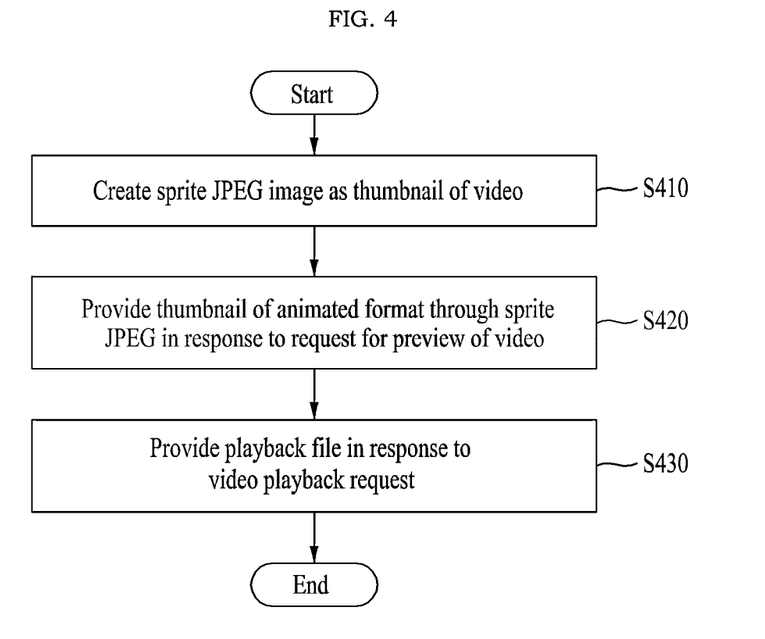
FIG. 4 is a flowchart illustrating an example of a method performed by a server according to at least one example embodiment.

FIG. 3 is a diagram illustrating an example of components includable in a processor of a server according to at least one example embodiment, and FIG. 4 is a flowchart illustrating an example of a method performed by a server according to at least one example embodiment.

The server 150 according to at least one example embodiment serves as a platform configured to provide a video related service. For example, the server 150 may correspond to a video platform that provides a video sharing service and/or a messenger platform that provides a video profile. An animated image providing system implemented as a computer may be configured in the server 150.

The server 150 may provide a video related service to a plurality of electronic devices 110, 120, 130, and/or 140 that are clients, and may provide the video related service through a dedicated application installed on each of the electronic devices 110, 120, 130, and/or 140, or access to a web/mobile site associated with the server 150.

In particular, the server 150 may provide an animated image based on a sprite image for a thumbnail of a video in providing the video related service.

Referring to FIG. 3, to perform the animated image providing method of FIG. 4, the processor 222 of the server 150 may include a thumbnail creator 310, a thumbnail provider 320, and/or a video provider 330 (also referred to herein as components of the processor 222). Depending on at least one example embodiment, the components of the processor 222 may be selectively included in or excluded from the processor 222. Also, depending on at least one example embodiment, the components of the processor 222 may be separated or merged for representations of functions of the processor 222.

The processor 222 and the components of the processor 222 may control the server 150 to perform operations S410 to S430 included in the animated image providing method of FIG. 4. For example, the processor 222 and the components of the processor 222 may be configured to execute an instruction according to a code of at least one program, and a code of an OS, included in the memory 221.

Here, the components of the processor 222 may be representations of different functions of the processor 222 performed by the processor 222 in response to an instruction provided from the program code stored in the server 150, for example, an instruction provided from the application executed on the server 150. For example, the thumbnail creator 310 may be used as a functional representation of the processor 222 that controls the server 150 to create a thumbnail of a video in response to the instruction.

The processor 222 may read an instruction from the memory 221 to which instructions associated with control of the server 150 are loaded. In this case, the read instruction may include an instruction to control the processor 222 to perform the following operations S410 to S430.

The following operations S410 to S430 may be performed in order different from the order illustrated in FIG. 4, and a process of omitting a portion of operations S410 to S430 or adding an operation thereto may be included.

Referring to FIG. 4, in operation S410, the thumbnail creator 310 may create a sprite JPEG image as a thumbnail of a video. The thumbnail creator 310 may create a sprite image using a frame of the video. According to at least one example embodiment, the video (e.g., the frames of the video) may be captured by a camera including converting captured light into image data (e.g., digital image data). According to at least one example embodiment, the camera may be included in an electronic device (e.g., the electronic device 110) and used to capture a video for use in a video profile as discussed further in connection with FIGS. 7 and 8.

A sprite image scheme relates to mixing a plurality of individual image files into a single image file, and displaying only a specific portion of an image using cascading style sheets (CSS) of a background-image and a background-position attribute in response to an actual use.

Figure 5:
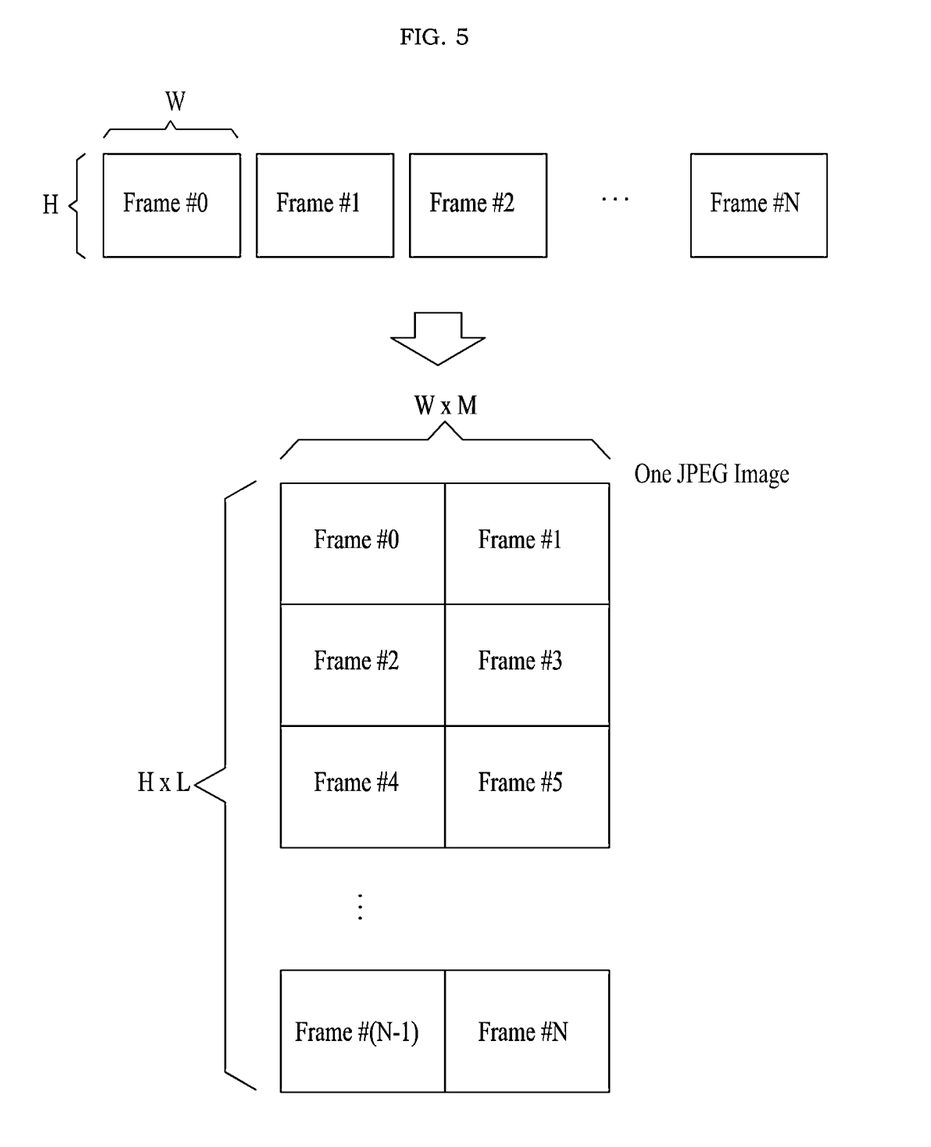
FIG. 5 illustrates an example of a process of creating a sprite joint photographic experts group (JPEG) image according to at least one example embodiment.

FIG. 5 illustrates an example of a process of creating a sprite JPEG image according to at least one example embodiment.

Referring to FIG. 5, the thumbnail creator 310 may create a single large JPEG image by concatenating the respective frames, for example, Frame #0, . . . , Frame #N), (hereinafter, referred to as a frame or a tile) from top to bottom in playback order. Decoding of JPEG images is performed from left to right and from top to bottom. In the case of concatenating tiles side to side that is a left-to-right direction, a relatively long time is used to acquire an initial tile. When decoding is completed up to a last tile of a single line from left to right, decoding may be performed for a subsequent line. A complete tile may be acquired after gathering a plurality of lines.

Therefore, an elongated configuration maximally or mostly from top to bottom, that is, in a vertical direction, may be used to acquire a tile in order with a minimum or lowest number of decoding iterations.

The thumbnail creator 310 may create a sprite JPEG image by concatenating all of the frames used for animation among frames of the video vertically at a raw image level.

In the case of JPEG images, a field that represents a resolution includes 2 bytes and thus, a maximum or highest horizontal/vertical value becomes 65535. If a single vertical line, that is, column is not represented due to a large number of frames, a number of columns increases to be a desired number, for example, M columns and the columns are arranged to be within a maximum or highest resolution. According to at least one example embodiment, if the number of frames used for the animation exceed the number of frames that may be represented in a single vertical line, the thumbnail creator 310 may increase a number of columns such that all of the frames used for the animation may be represented, and the columns may be arranged to be within a maximum or highest resolution.

For example, referring to FIG. 5, the thumbnail creator 310 may compress a raw image arranged in two columns into a single JPEG image (e.g., L rows and M columns). The thumbnail creator 310 may create the JPEG image in which N+1 frames are arranged vertically in two lines, that is, columns, by arranging frames from left to right and from top to down based on JPEG decoding order, for example, by arranging a first row in order of Frame #0 and Frame #1, and arranging a subsequent row in order of Frame #2 and Frame #3.

Referring again to FIG. 4, in operation S420, in response to receiving a request for a preview of the video from the electronic device 110 that is a client, the thumbnail provider 320 may provide the thumbnail in an animated format through the sprite JPEG image created in operation S410.

A client end, that is, the electronic device 110, may decode a single sprite JPEG image that is created for the thumbnail of the video, may crop the decoded sprite JPEG image based on a preset or alternatively, given frame rate, and may display the cropped sprite JPEG image.

The thumbnail provider 320 may provide the animated thumbnail of the video by including a custom header for representing the sprite JPEG image in an animated format. According to at least one example embodiment, the sprite JPEG image may be in an animated format based on the frames used to generate the sprite JPEG image and/or the information included in the custom header.

For example, the thumbnail provider 320 may include a custom header in a header, for example, a comment header, that does not affect decoding, and may provide information about a resolution, a frame rate, and/or an animation iteration count through the custom header. According to at least one example embodiment, the comment header may be a header that does not affect decoding for conventional JPEG image decoding, but may be altered to include information for use in decoding, cropping and/or displaying the animated thumbnail (e.g., the sprite JPEG image) of the video.

If a specification is determined in advance, information about a size or a number of frames of an original video, and a frame rate, may not be provided in the custom header. If another specification should be used based on an application, information about the size, the number of frames of the original video and/or the frame rate may be specified in a sprite JPEG file created for a thumbnail of a video.

Therefore, the processor 222 may store information for animation playback in a comment header designated by JPEG. In a conventional JPEG decoder, the corresponding information may be ignored and an animated image client may extract and use the corresponding information.

Figure 6:
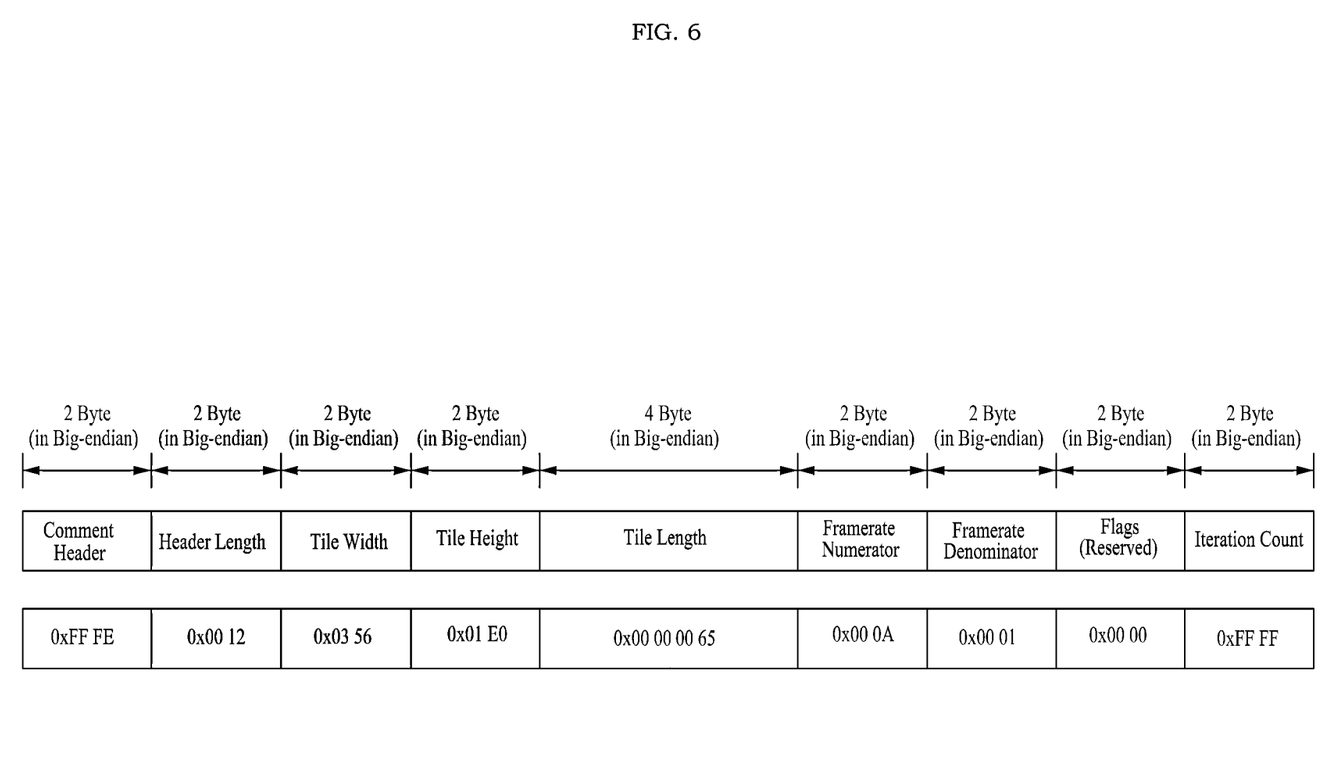
FIG. 6 illustrates an example of a data structure for providing information for an animation according to at least one example embodiment.

FIG. 6 illustrates an example of a data structure for providing information for animation according to at least one example embodiment.

Referring to FIG. 6, a sprite JPEG image includes a comment header. Here, the comment header and a header length follow a basic JPEG standard. A tile width and a tile height represent a width (W) and a height (H) of a frame of FIG. 5, and a tile length represents a total number of frames. A frame rate is equal or similar to {(Frame Numerator)/(Frame Denominator)}, and flags are set based on a bit unit for a particular purpose, such as Progressive, Alpha Component, and/or the like, depending on at least one example embodiment. An iteration count represents a number of times an animation is iterated. If iteration count=−1, it represents an infinite iteration. The comment header may be inserted at any location before a start of scan (SOS). For example, the processor 222 may insert the comment header immediately or shortly after, or contemporaneous with, the start of image (SOI) (0xFF D8), that is, a first start of an image.

According to at least one example embodiment, to implement the animated thumbnail of the video, all of the frames of the video may be pre-stored or stored in a buffer, for example, a YUV buffer. According to at least one example embodiment, one or more of the following methods for implementing the animated thumbnail of the video may be applied.

First, a partial decoding method may be applied.

A client end may use a JPEG decoder configured to support partial decoding. Performing sequential partial decoding of a scan line may prevent or reduce additional overhead. An overhead issue may be overcome by partially decoding a desired scan line several times after initializing a frame once, similar to using a video decoder.

Second, a method of using a define restart interval (DRI) header may be applied.

To restore lost data in JPEG, the processor 222 may add a restart marker inside frame data. The DRI header may include an interval value that determines a number of minimum coded units (MCUs) used to add the restart marker.

In the case of using a DRI, an encoding process and a decoding process may follow as.

1. An encoder may (1) Specify, in a DRI header, an interval value as a number of MCUs. For example, if 296×96, (6 MCUs)×(6 MCUs)=36.

(2) Insert RST #(Restart Marker) per MCUs corresponding to a single tile.

(3) Create a JPEG header for a single tile. For example, the JPEG header for 96×96 is created. Here, information, such as a define quantization table (DQT) and a define Huffman table (DHT), is created to be the same as or similar to the original JPEG.

(4) Store the JPEG header in the comment header.

2. A decoder may (1) Extract a JPEG header of a tile included in a comment header.

(2) Extract a bitstream of a tile of desired order using RST #.

(3) Create a unit JPEG file based on (JPEG header of tile)+(bitstream of extracted tile)+(0xFF D9: End of Image Marker).

In the case of using the DRI header, a method of grouping a desired number of tiles, for example, N tiles and adding RST # may be applied.

At least one example embodiment may provide an animated image through a sprite JPEG image for a thumbnail of a video and thereby may implement an animation effect with smaller data than other formats that support animation and may achieve further excellent image quality. According to at least one example embodiment, the thumbnail may provide an animation effect by separately displaying (e.g., sequentially displaying) the frames of the sprite JPEG image (e.g., the frames concatenated during creation of the sprite JPEG image).

In the case of using a JPEG decoder, the client end is better optimized or improved than other format decoders that support animation, and thus, a light driving is possible.

In particular, in the case of encoding using progressive JPEG, a preview of a low-quality animated image may be provided at a significantly low network speed. Alternatively, animated images with various resolutions may be played back using a single JPEG image set arranged in a vertically elongated form.

Referring again to FIG. 4, in operation S430, in response to receiving a video playback request from the electronic device 110, the video provider 330 may provide the corresponding video as a playback file (e.g., mp4) in a preset or alternatively, given format. In response to receiving a playback request for a video of which a preview is provided using an animation effect through the sprite JPEG image, the video provider 330 may provide, to the electronic device 110, a video in a format in which a file is playable.

Figure 7:
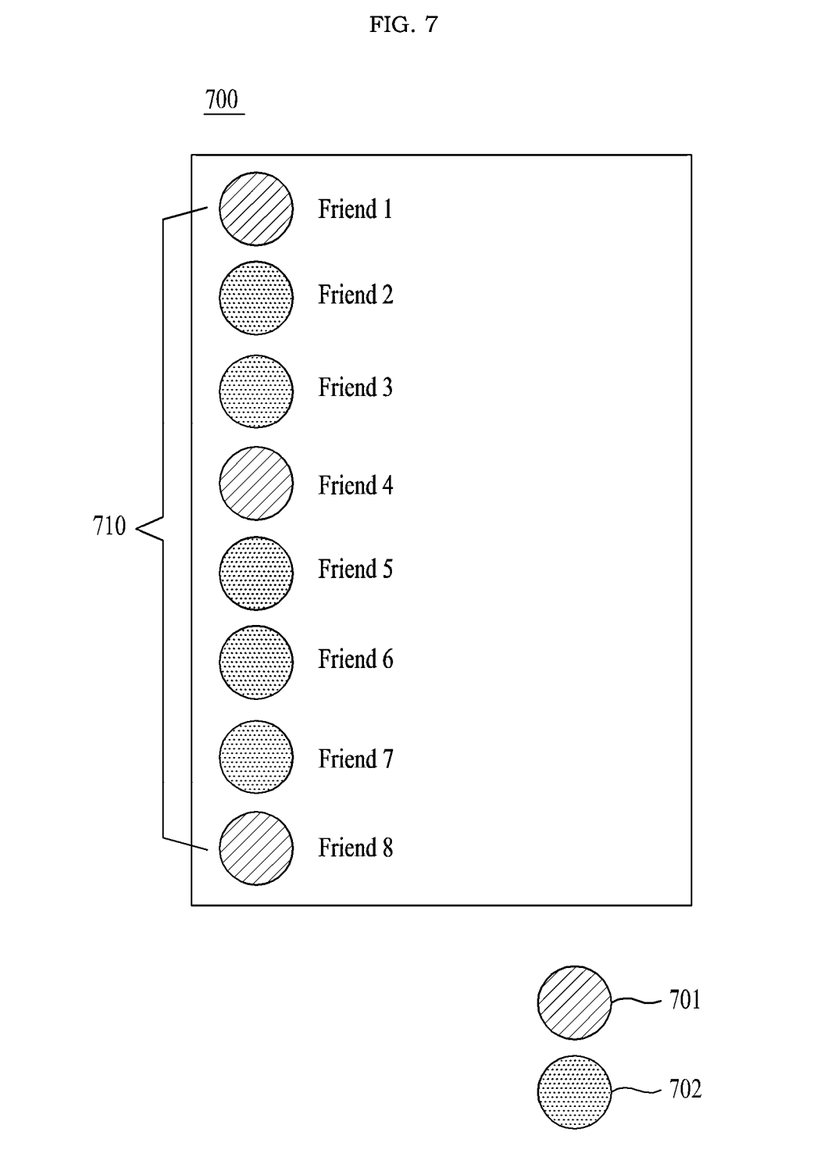
FIGS. 7 and 8 illustrate examples of an interface screen of providing a preview of a video profile included in a messenger friend list using an animation effect through a sprite joint photographic experts group (JPEG) image according to at least one example embodiment.
Figure 8:
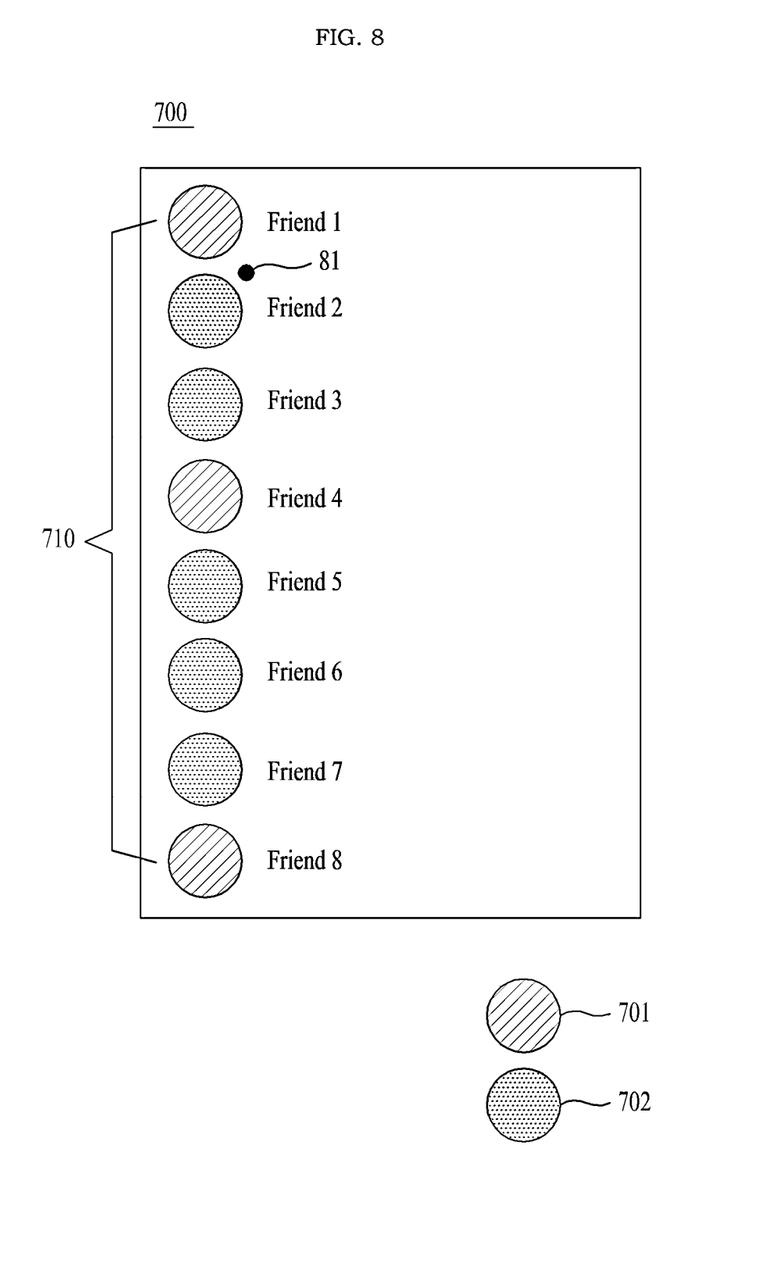
Figure 9:
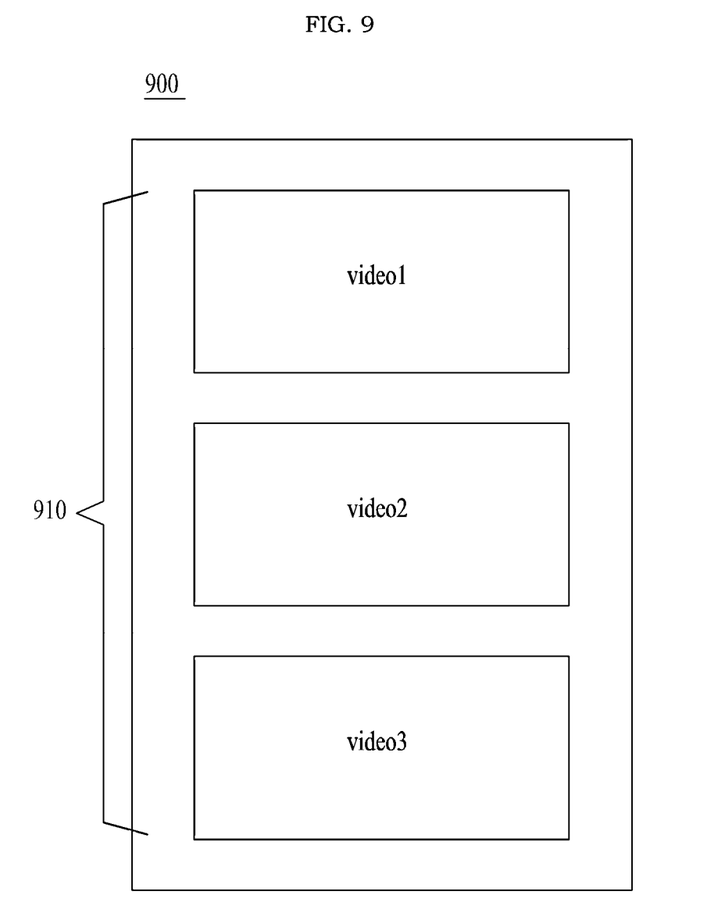
FIG. 9 illustrates an example of an interface screen of providing a preview of a video included in a video list using an animation effect through a sprite JPEG image according to at least one example embodiment.

FIGS. 7 to 9 illustrate examples of a process of providing an animation function through a sprite JPEG image according to at least one example embodiment.

FIGS. 7 and 8 illustrate examples of an interface screen included in a messenger and displayed on a display of the electronic device 110.

Referring to FIG. 7, a friend list 710 may be included in a messenger screen 700. The friend list 710 may include profile information, such as, for example, a name and a photo set by each party. Here, a profile photo may be set as a still image profile 701 or a video profile 702.

The processor 212 of the electronic device 110 may receive, from the server 150, a thumbnail of the profile photo set by each user included in the friend list 710 and may display the thumbnail in the friend list 710. According to at least one example embodiment, the processor 212 may generate a preview of the video profile using an animation effect based on the sprite JPEG image for display on the friend list 710. According to at least one example embodiment, the processor 212 may generate a graphical user interface (GUI) including a plurality of preview thumbnails of video profiles based on a plurality of sprite JPEG images corresponding a plurality of friends in the friend list 710.

In the related art, in the case of a video, previews of a plurality of videos may not be simultaneously or contemporaneously provided on a single screen. In the case of the friend list 710, tens of profile photos may be displayed on a single screen. Here, in the case of the video profile 702, a preview may be provided only for a preset or alternatively, given maximum or upper limit number of users, for example, a maximum or upper limit of four users, and a first frame image or a thumbnail image in a still state may be displayed for each remaining user.

To outperform the above issue, at least one example embodiment may implement an animated thumbnail through a sprite JPEG image for the video profile 702.

If a user of a messenger sets a profile photo as a video, the processor 222 of the server 150 may create a sprite JPEG image as a thumbnail of the video using a frame of the corresponding video. The processor 222 may forward the sprite JPEG image created as the thumbnail of the video to an electronic device of another user that is a friend of the user having set the profile photo as the video.

The processor 212 of the electronic device 110 may receive the sprite JPEG image from the server 150 with respect to the video profile 702 included in the friend list 710, may decode the received sprite JPEG image, may crop only a portion of the decoded sprite JPEG image (e.g., a subset of the frames included in the sprite JPEG image) based on a preset or alternatively, given frame rate, and may display the cropped sprite JPEG image. That is, the processor 212 may provide a preview function of the corresponding video using an animation effect through the sprite JPEG image with respect to the video profile 701 included in the friend list 710.

If the user of the messenger changes a profile photo with a video, the processor 222 of the server 150 may create a sprite JPEG image for a thumbnail of the corresponding video and may forward a profile change notification and the sprite JPEG image to an electronic device of another user that is a friend of the user having changed the profile photo.

Referring to FIG. 8, in response to receiving the profile change notification and the sprite JPEG image from the server 150, the processor 212 of the electronic device 110 may indicate the profile change notification using a point 81 on a friend item of which a profile is changed in the friend list 710 and, at the same time or contemporaneously, may decode the sprite JPEG image and provide a preview of the video profile 702 of the corresponding friend.

If the user of the electronic device 110 selects the video profile 702 of a specific friend from the friend list 710 and requests a playback of a corresponding video, the processor 212 may receive the corresponding video from the server 150 as a playback file in a preset or alternatively given format, and may decode and play back the video.

Dissimilar to the existing method that limits a maximum or upper threshold number of previews for video profiles capable of being displayed on a single screen, at least one example embodiment may simultaneously or contemporaneously display a preview of the video profile 702 without similar limitations, or any limitations, on a number of available previews for the video profiles 702 using an animation effect through the sprite JPEG image.

The animated thumbnail through the sprite JPEG image may be applicable to an environment in which a video list including at least one video is provided, in addition to a messenger profile.

FIG. 9 illustrates an example of a video sharing service screen displayed on a display of the electronic device 110.

For example, the server 150 may provide a video sharing service that allows users to upload and/or view videos. With respect to a video uploaded by a service user, the processor 222 of the server 150 may create a sprite JPEG image as a thumbnail of the corresponding video and may provide a preview function of the video using an animation effect through the created sprite JPEG image.

For example, referring to FIG. 9, in the case of displaying a video sharing service screen 900 that includes a video list 910 through interaction with the server 150, the processor 212 of the electronic device 110 may receive a sprite JPEG image of each of videos included in the video list 910 from the server 150.

The processor 212 may decode the sprite JPEG image received from the server 150, may crop only at least a portion of the decoded sprite JPEG image (e.g., a subset of the frames included in the sprite JPEG image) based on a preset or alternatively, given frame rate, and may display the cropped sprite JPEG image. That is, the processor 212 may provide a preview of the corresponding video using an animation effect through the sprite JPEG image of each of the videos included in the video list 910. According to at least one example embodiment, the processor 212 may generate a preview of the video using an animation effect based on the sprite JPEG image for display on the video list 910. According to at least one example embodiment, the processor 212 may generate a graphical user interface (GUI) including a plurality of preview thumbnails of videos based on a plurality of sprite JPEG images corresponding a plurality of videos in the video list 910.

With respect to all of the videos displayed on a single screen of the video sharing service screen 900, a preview function may be simultaneously or contemporaneously provided using the animation effect through the sprite JPEG image.

If the user of the electronic device 110 selects a specific video from the video list 910 and requests a playback of the selected specific video, the processor 212 may receive the specific video as a playback file in a preset or alternatively, given format from the server 150, and may decode and playback the specific video.

According to at least one example embodiment, it is possible to provide a preview function of a video using an animation effect through a sprite JPEG image by implementing an animated thumbnail of the video using the sprite JPEG image. According to at least one example embodiment, it is possible to provide an animated thumbnail with enhanced image quality using a smaller file size with respect to a video by creating an animated image through a sprite JPEG image. In particular, it is possible to simultaneously or contemporaneously provide animated thumbnails of a plurality of videos without limitations.

A tradeoff exists between image quality and compression efficiency when using conventional formats for providing animated video thumbnail images. Accordingly, the conventional formats either excessively degrade the quality of the image or excessively degrade the compression efficiency. Also, conventional devices and methods using the conventional formats, based at least in part on the above-mentioned tradeoff, are unable to provide the animated thumbnail images in environments with low network speed, and/or are unable to simultaneously or contemporaneously display a plurality of animated thumbnail images.

However, at least one example embodiment describes improved devices and methods for providing a sprite JPEG based animated video thumbnail image. The improved devices and methods provide an animated thumbnail image based on a sprite JPEG image. Accordingly, the improved devices and methods provide an animated thumbnail image of enhanced image quality and a smaller file size in comparison to the animated thumbnail images generated based on the conventional formats. Thus, the improved devices and methods overcome the tradeoff of the conventional devices and methods to improve both the quality of the image and the compression efficiency. Also, the improved devices and methods overcome the deficiencies of the conventional devices and methods to enable provision the animated thumbnail images in environments with low network speed and/or simultaneously or contemporaneously display a plurality of animated thumbnail images.

According to at least one example embodiment, operations described herein as being performed by the electronic device 110, the processor 212, the server 150, the processor 222, the thumbnail creator 310, the thumbnail provider 320, and/or the video provider 330 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to at least one example embodiment may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes at least one example embodiment, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An animated image providing method implemented by a computer apparatus comprising processing circuitry, the animated image providing method comprising:
   creating, by the processing circuitry, a sprite joint photographic experts group (JPEG) image from a video in an animated format by concatenating at least a portion of frames of the video in a vertical direction from top to bottom; and
   providing, by the processing circuitry, an animated thumbnail of the video based on the sprite JPEG image.

2. The animated image providing method of claim 1, wherein the creating comprises compressing the portion of the frames into a single JPEG image, the portion of the frames being arranged in a number of columns based on a maximum resolution.

3. The animated image providing method of claim 1, wherein the animated thumbnail comprises a header specifying animation playback information.

4. The animated image providing method of claim 3, wherein the animation playback information comprises a resolution, a frame rate, and an animation iteration count.

5. The animated image providing method of claim 3, wherein the header is a JPEG comment header.

6. The animated image providing method of claim 1, wherein the providing provides the animated thumbnail to a client end, the client end being configured to:
   decode the sprite JPEG image to obtain a decoded sprite JPEG image;
   crop the decoded sprite JPEG image based on a frame rate to obtain a cropped sprite JPEG image; and
   display the cropped sprite JPEG image.

7. The animated image providing method of claim 1, wherein the providing provides the animated thumbnail to an electronic device of a user in response to the video being set as a profile of another user of a messenger platform, the user having a relationship with the other user on the messenger platform.

8. The animated image providing method of claim 1, wherein
   the animated thumbnail is a preview of the video; and
   the providing provides the animated thumbnail to an electronic device using a video sharing service in response to the video being uploaded to a video sharing service platform.

9. An animated image providing method implemented by a computer apparatus comprising processing circuitry, the animated image providing method comprising:
   receiving, by the processing circuitry, a sprite joint photographic experts group (JPEG) image in an animated format from a server, the sprite JPEG image corresponding to a thumbnail of a video, the sprite JPEG image being based on a concatenation of at least a portion of frames of the video in a vertical direction from top to bottom, and the video being set as a video profile among a plurality of profiles in a friend list on a messenger; and
   generating, by the processing circuitry, a preview of the video profile using an animation effect based on the sprite JPEG image for display on the friend list.

10. The animated image providing method of claim 9, wherein the portion of the frames is compressed into a single JPEG image, the portion of the frames being arranged in a number of columns based on a maximum resolution.

11. An animated image providing method implemented by a computer apparatus comprising processing circuitry, the animated image providing method comprising:
   receiving, by the processing circuitry, sprite joint photographic experts group (JPEG) image in an animated format from a server, the sprite JPEG image corresponding to a thumbnail of a video, the sprite JPEG image being based on a concatenation of at least a portion of frames of the video in a vertical direction from top to bottom, the video being included on a video list, and the video list including at least one video on a video sharing service; and
   generating, by the processing circuitry, a preview of the video using an animation effect based on the sprite JPEG image for display on the video list.

12. A non-transitory computer-readable record medium storing instructions that, when executed by at least one processor, cause the at least one processor to perform the animated image providing method of claim 1.

13. A computer apparatus comprising:
   processing circuitry configured to cause the computer apparatus to,
      create a sprite joint photographic experts group (JPEG) image from a video in an animated format by concatenating at least a portion of frames of the video in a vertical direction from top to bottom, and
      provide an animated thumbnail of the video based on the sprite JPEG image.

14. The computer apparatus of claim 13, wherein the animated thumbnail comprises a header specifying animation playback information.

15. The computer apparatus of claim 14, wherein the animation playback information comprises a resolution, a frame rate, and an animation iteration count.

16. The computer apparatus of claim 14, wherein the header is a JPEG comment header.

17. The computer apparatus of claim 13, wherein the processing circuitry is configured to cause the computer apparatus to provide the animated thumbnail to a client end, the client end being configured to:
   decode the sprite JPEG image to obtain a decoded sprite JPEG image,
   crop the decoded sprite JPEG image based on a frame rate to obtain a cropped sprite JPEG image, and
   display the cropped sprite JPEG image.

18. The computer apparatus of claim 13, wherein the processing circuitry is configured to cause the computer apparatus to provide the animated thumbnail to an electronic device of a user in response to the video being set as a profile of another user of a messenger platform, the user having a relationship with the other user on the messenger platform.

19. The computer apparatus of claim 13, wherein
   the animated thumbnail is a preview of the video; and
   the processing circuitry is configured to cause the computer apparatus to provide the animated thumbnail to an electronic device using a video sharing service in response to the video being uploaded to a video sharing service platform.

20. The computer apparatus of claim 13, wherein the processing circuitry is configured to cause the computer apparatus to create the sprite JPEG image including compressing the portion of the frames into a single JPEG image, the portion of the frames being arranged in a number of columns based on a maximum resolution.

* * * * *